United States Patent
Fandli et al.

(10) Patent No.: US 11,012,310 B2
(45) Date of Patent: May 18, 2021

(54) MANAGING CONTAINERS BASED ON PAIRING KEYS IN A SEGMENTED NETWORK ENVIRONMENT

(71) Applicant: Illumio, Inc., Sunnyvale, CA (US)

(72) Inventors: Juraj George Fandli, Campbell, CA (US); Mukesh Gupta, Fremont, CA (US)

(73) Assignee: ILLUMIO, INC., Sunnyvale, CA (US)

( * ) Notice: Subject to any disclaimer, the term of this patent is extended or adjusted under 35 U.S.C. 154(b) by 33 days.

(21) Appl. No.: 16/000,847

(22) Filed: Jun. 5, 2018

(65) Prior Publication Data

US 2019/0372850 A1 Dec. 5, 2019

(51) Int. Cl.
*G06F 9/455* (2018.01)
*H04L 12/24* (2006.01)
(Continued)

(52) U.S. Cl.
CPC ...... *H04L 41/0893* (2013.01); *G06F 9/45558* (2013.01); *H04L 9/3073* (2013.01);
(Continued)

(58) Field of Classification Search
CPC .......... G06F 2009/45562; G06F 21/53; G06F 2009/45587; G06F 9/545; G06F 9/45558;
(Continued)

(56) References Cited

U.S. PATENT DOCUMENTS 7,925,666 B1    4/2011 Johnson et al.
10,104,185 B1 * 10/2018 Sharifi Mehr .......... H04L 67/16
(Continued)

FOREIGN PATENT DOCUMENTS

CN          101595465 A    12/2009
WO     WO2009/008482 A1    1/2009
WO    WO 2012/160809 A1    11/2012

OTHER PUBLICATIONS

Akai, K et al., "Proposal for Cooperation Resource Information Manager and Access Control List Manager of IEEE1888," Feb. 7, 2013, IE/CE Technical Report, vol. 112, No. 430, 1 page (English abstract only).

(Continued)

*Primary Examiner* — Dong U Kim
(74) *Attorney, Agent, or Firm* — Fenwick & West LLP

(57) ABSTRACT

A container orchestration server stores pairing keys in association with container profiles. A container orchestration agent executing on an operating system instance instantiates a new container according to a particular container profile in response to an instruction from the container orchestration server and stores the pairing key as metadata associated with the container. An enforcement module detects the instantiation of the container and obtains the corresponding pairing key from the container orchestration agent. The enforcement module transmits the pairing key to a segmentation server for validation. If the segmentation server validates the key, the segmentation server determines a label set corresponding to the container profile associated with the pairing key and generates management instructions for the container based on the label set. The management instructions, when enforced by the operating system, controls communications between the container and other workloads in accordance with a segmentation policy.

20 Claims, 5 Drawing Sheets

(51) Int. Cl.
 H04L 29/06 (2006.01)
 H04L 29/08 (2006.01)
 H04L 9/30 (2006.01)
(52) U.S. Cl.
 CPC .......... *H04L 63/0263* (2013.01); *H04L 63/12* (2013.01); *H04L 67/303* (2013.01); *G06F 2009/45562* (2013.01); *G06F 2009/45579* (2013.01)
(58) Field of Classification Search
 CPC ....... G06F 2009/45579; H04L 41/0893; H04L 63/0263; H04L 63/12; H04L 67/303; H04L 9/3073
 See application file for complete search history.

(56) References Cited

U.S. PATENT DOCUMENTS

| | | | | |
|---|---|---|---|---|
| 2017/0177413 | A1* | 6/2017 | Wisniewski | G06F 9/5055 |
| 2017/0353496 | A1* | 12/2017 | Pai | G06F 21/53 |
| 2018/0026911 | A1* | 1/2018 | Anholt | H04L 12/4641 |
| | | | | 709/226 |
| 2018/0167487 | A1* | 6/2018 | Vyas | G06F 9/5027 |
| 2018/0309637 | A1* | 10/2018 | Gill | H04L 67/36 |
| 2018/0357068 | A1* | 12/2018 | Ambichl | G06F 9/5077 |
| 2019/0075130 | A1* | 3/2019 | Petry | H04L 67/2814 |
| 2019/0089651 | A1* | 3/2019 | Pignataro | H04L 49/3009 |

OTHER PUBLICATIONS

Examination Report, European Patent Office, European Application No. 14856997.3, dated Jan. 3, 2019, 7 pages.

Kakuta, T. et al., "A detection method of malware infections based on 'graylists,'" IE/CE Technical Report, Jun. 26, 2014, vol. 114, No. 118, 7 pages (with English abstract).

Netcitadel et al., "Firewall Builder 5 User's Guide," May 21, 2013, Retrieved from the internet: URL: http://fwbuildersourceforge.net/4.0/docs/users_guide5/UsersGuide5.pdf [Accessed Jan. 17, 2019].

Japan Patent Office, Official Notice of Rejection, JP Patent Application No. 2016-552416, dated Oct. 2, 2018, six pages.

* cited by examiner

MANAGING CONTAINERS BASED ON PAIRING KEYS IN A SEGMENTED NETWORK ENVIRONMENT

BACKGROUND

Technical Field

This application relates to managing a segmentation policy that controls communications between workloads including containers.

Description of Related Art

A segmentation policy comprises a set of rules that control which workloads may communicate on a network and may place restrictions on how such workloads may communicate. To enable an administrator to manage the segmentation policy at a high level of abstraction, labels are assigned to workloads and the rules are specified in terms of the labels. Thus, for example, a rule may indicate that a first group of workloads having a first label set are permitted to communicate with a second group of workloads having a second label set. Absent a mechanism for securely assign labels, an owner of a workload may be able to manually assign arbitrary labels to the workload to enable the workload to gain access to other workloads, thereby creating a security risk. However, a challenge exists in how to securely assign labels to workloads embodied in virtual environments such as containers that can be quickly instantiated or removed from an administrative domain in an automated way depending on the current processing needs.

SUMMARY

A system, non-transitory computer-readable storage medium, and method enforces a segmentation policy. A container orchestration agent receives an instruction to instantiate a first container and receives a first container profile and a first pairing key from a container orchestration server. The container orchestration agent instantiates the first container on an operating system of a computing device based on the first container profile and stores the first pairing key as metadata associated with the first container. An enforcement module on the operating system detects the instantiating of the first container. Responsive to detecting the instantiating of the first container, the enforcement module obtains a first pairing key associated with the first container profile from the container orchestration agent. The enforcement module generates a first pairing request to a segmentation server based on the first pairing key. Responsive to the segmentation server validating the first pairing request, the segmentation server generates first management instructions for enforcing one or more communication rules applicable to the first container. The enforcement module enforces the first management instructions to control communications to and from the first container.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A container orchestration server receives pairing keys from a segmentation server and stores the pairing keys in association with container profiles. The container orchestration server sends an instruction to a container orchestration agent on an operating system instance to instantiate a new container based on a particular container profile and provides the corresponding pairing key. The container orchestration agent instantiates the new container associated with the particular container profile and stores the pairing key as metadata associated with the container. An enforcement module detects the instantiation of the container and obtains the corresponding pairing key from the container orchestration agent. The enforcement module transmits the pairing key to a segmentation server for validation. If the segmentation server validates the key, the segmentation server determines a label set corresponding to the container profile associated with the pairing key and generates a set of management instructions for the container from the segmentation policy based on the label set. The management instructions, when enforced by the operating system, enable communications between the container and other workloads permitted by the rules while blocking communications not expressly permitted by the rules. The segmentation server furthermore adds a record of the container and its associated label set to a workload database to enable other workloads to communicate with the container in accordance with the rules. The assignment of labels to containers is beneficially performed securely by requiring validation of a pairing key stored by the container orchestration agent, thereby protecting against undesired access to workloads and improving security of an administrative domain.

Figure 1:
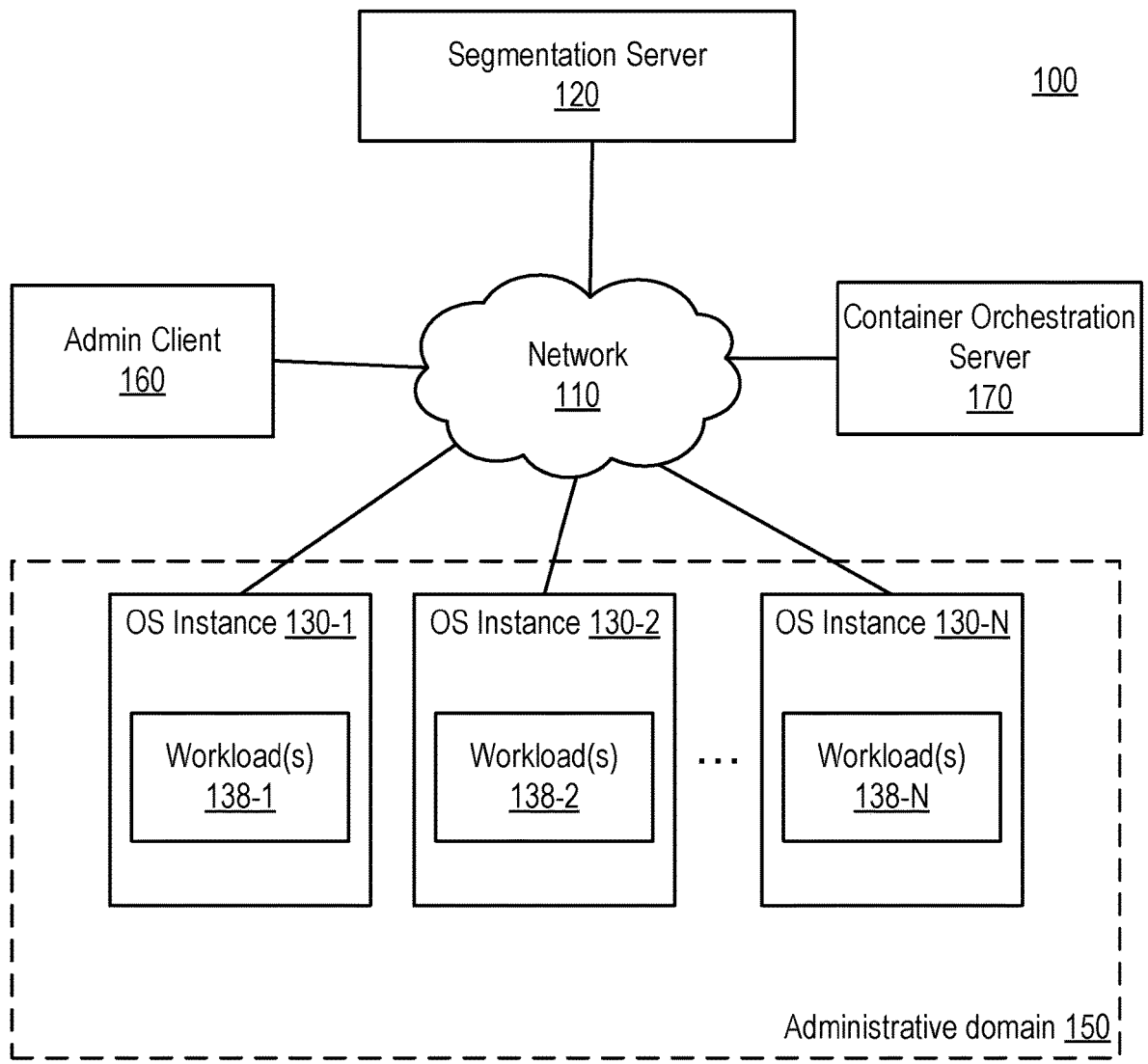
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110, an administrative client 160, a container orchestration server 170, and an administrative domain 150 that includes a plurality of operating system (OS) instances 130 (e.g., OS instances 130-1, 130-2, . . . , 130-N). The administrative domain 150 can correspond to an enterprise such as, for example, a service provider, a corporation, a university, or a government agency under control of the segmentation server 120.

The network 110 represents the communication pathways between the segmentation server 120, the administrative client 160, the container orchestration server 170, and the OS instances 130. In one embodiment, the network 110 uses standard communications technologies and/or protocols and can include the Internet. In another embodiment, the entities on the network 110 can use custom and/or dedicated data communications technologies.

The OS instances 130 comprise instances of an operating system executing on one or more computing devices. An OS instance 130 may execute directly on a physical machine or on a virtual machine that executes on one or more computing devices. A single physical or virtual machine may operate a single OS instance 130 or may operate multiple OS instances 130 The OS instances 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the OS instance 130. In some instances, an OS instance 130 may operate only a single workload 138. In other instances, an OS instance 130 may operate multiple workloads 138 that may be independently addressable and may perform different independent computing functions. The workloads 138 on the OS instances 130 may communicate with other workloads 138 on different OS instances 130 within the administrative domain 150 to perform various tasks.

Some workloads 138 may be embodied as containers executing on an OS instance 130. A container comprises is a set of processes executing in an isolated user space instance (i.e., the container namespace) that share the kernel of the OS instance 130 with host processes and with other containers. A container may be defined by a combination of its kernel features, control groups, and its namespace. Containers are useful to provide isolation between different virtual hosting environments executing on the same OS instance 130. For example, the processes associated with a container on a given OS instance 130 have visibility only into the resources within its corresponding container namespace and are isolated from resources outside the corresponding container namespace. In an administrative domain 150, containers may be utilized to provide isolation between different types of applications. For example, a first container may execute processes associated with database applications and a second container may execute processes associated with web applications.

The segmentation server 120 is a computer (or set of computers) that obtains and stores information about the OS instances 130 on the network 120 and the workloads 138 executing on the OS instances 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on an OS instance 130-1 is allowed to provide a particular service to a workload 138-2 operating on an OS instance 130-2. Absent other rules, the workload 138-1 will thus be blocked from providing the service to a workload 138-N operating on an OS instance 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the segmentation server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding OS instance 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
|---|---|
| Role | M: The role of the managed server within the administrative domain.<br>V: web, API, database |
| Environment | M: The lifecycle stage of the managed server.<br>V: production, staging, development |
| Application | M: The logical application (higher-level grouping of managed servers) to which the managed server belongs.<br>V: trading, human resources |
| Line of Business | M: The business unit to which the managed server belongs.<br>V: marketing, engineering |
| Location | M: The location of the managed server. Can be physical (e.g., country or geographical region) or logical (e.g., network). Physical is particularly useful for expressing geographic compliance requirements.<br>V: US or EU (physical), us-west-1 or us-east-2 (logical) |

TABLE 1-continued

Example of logical management model

| Dimension | Meaning (M), Values (V) |
| --- | --- |
| User Group | M: The user group containing the user logged onto the managed server.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may retain a repository storing information about the OS instances 130 and the workloads 138 managed by the segmentation server 120. For example, the segmentation server 120 may store, for each workload 138, a workload and membership information indicating one or more groups of workloads 138 to which each workload 138 belong (e.g., as defined by the respective label sets for the workloads 138).

Table 2 illustrates an example of information stored by the segmentation server 120. Here, the "workload ID(s) represent the workload identifier for the workload(s) 138. In the case that multiple workloads 138 execute on a single OS instance 130 (e.g., as containers), each workload 138 is assigned a unique workload identifier. The memberships represent groups to which one or more workloads 138 belongs. Each group may correspond to a unique label set involving one or more dimensions.

TABLE 2

Example of a Repository Table

| Workload ID(s) | Memberships |
| --- | --- |
| ID1 | A, C, D |
| ID2 | B, C |
| ID3 | D |
| . | . |
| . | . |
| . | . |
| IDn | B, D, E, F |

Instead of enforcing the segmentation policy at a centralized device, the segmentation policy is instead enforced by at least a subset of the OS instances 130. To enable enforcement of the segmentation policy, the segmentation server 120 generates a set of management instructions and distributes the management instructions to the OS instances 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different OS instances 130 so that each OS instance 130 gets only the management instructions relevant to its operation. Here, the segmentation server 120 may determine which rules are relevant to a given OS instance 130 and distribute the relevant rules to that OS instance 130. A rule may be deemed relevant to a particular OS instance 130 if that OS instance 130 executes one or more workloads 138 that belongs to a group (defined by one or more label sets) referenced by the rule. The segmentation server 120 may furthermore determine which membership information is relevant to each OS instance 130 and distribute the relevant membership information to each respective OS instance 130. Here, membership information may be relevant to a particular OS instance 130 if it defines membership of a group referenced by a rule deemed relevant to the particular OS instance 130. Further details of a segmentation system for controlling communications between OS instances 130 based on labels is described in U.S. Patent Application Publication No. 2014/0373091 entitled "Distributed Network Security Using a Logical Multi-Dimensional Label-Based Policy Model," to Paul J. Kirner, et al., which is incorporated by reference herein.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the OS instances 130 and workloads 138 on the network 120 and view traffic flows between the workloads 138.

The container orchestration server 170 manages containers that may execute as workloads 138 on the OS instances 130 in the administrative domain 150. The container orchestration server 170 may store various metadata relating to operation of the containers including pairing keys that enable containers to be securely paired with the segmentation server 120 and registered as workloads 138 in the repository. An example of a container orchestration server 170 may comprise for example, KUBERNETES or DOCKER ENTERPRISE EDITION.

Figure 2:
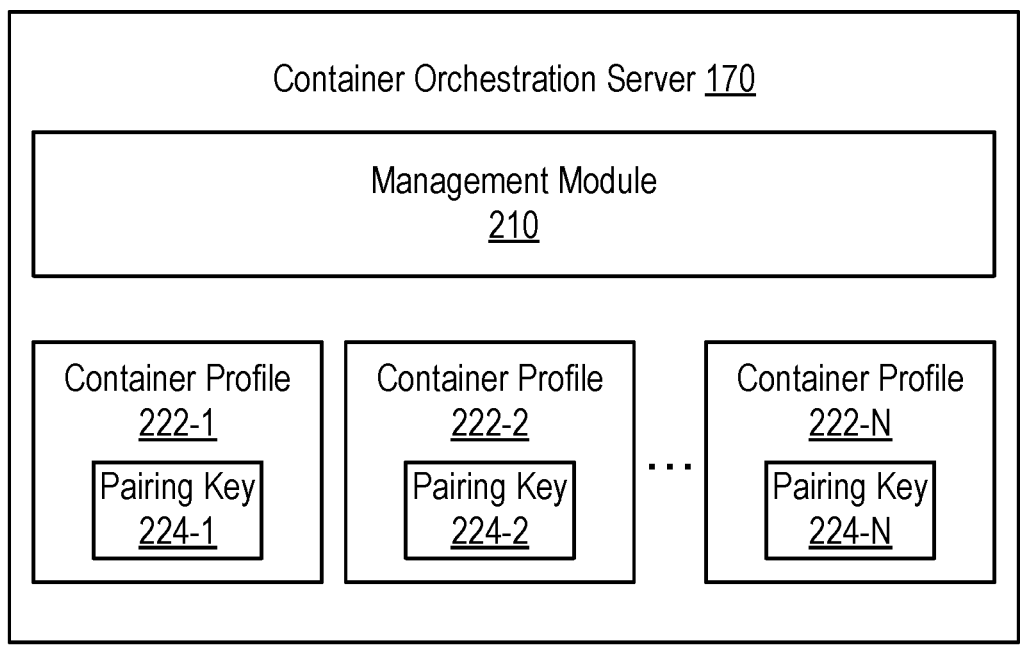
FIG. 2 is a block diagram illustrating an example embodiment of a container orchestration server.

FIG. 2 illustrates an example embodiment of a container orchestration server 170. The container orchestration server 170 comprises a management module 210 that manages aa plurality of container profiles 222 (e.g., container profile 222-1, container profile 222-2, . . . , container profile 222-N) that include metadata corresponding to different configurations of the containers. For example, the container profile 222 may specify one or more applications or services to be provided by a particular container having that container profile 222, one or more label sets to be associated with a particular container having that container profile 222, or other configured characteristics for the container. Each container profile 222 may furthermore include a respective pairing key 224 (e.g., pairing key 224-1, pairing key 224-2, . . . , pairing key 224-N). The pairing key 224 comprises an identifier (e.g., an alphanumeric string or hash thereof) that is uniquely associated with a particular container profile 222. The management module 210 may generate instructions to an OS instance 130 to instantiate a new container having a particular profile 222, remove a container, or change a profile associated with the container. The pairing key 224 associated with the particular container profile 222 may be sent to the OS instance 130 together with an instruction to instantiate the new container. The management module 210 may furthermore manage communications with the administrative client 160 to enable an administrator to configure the container profiles 222 and to receive the pairing keys 224.

Figure 3:
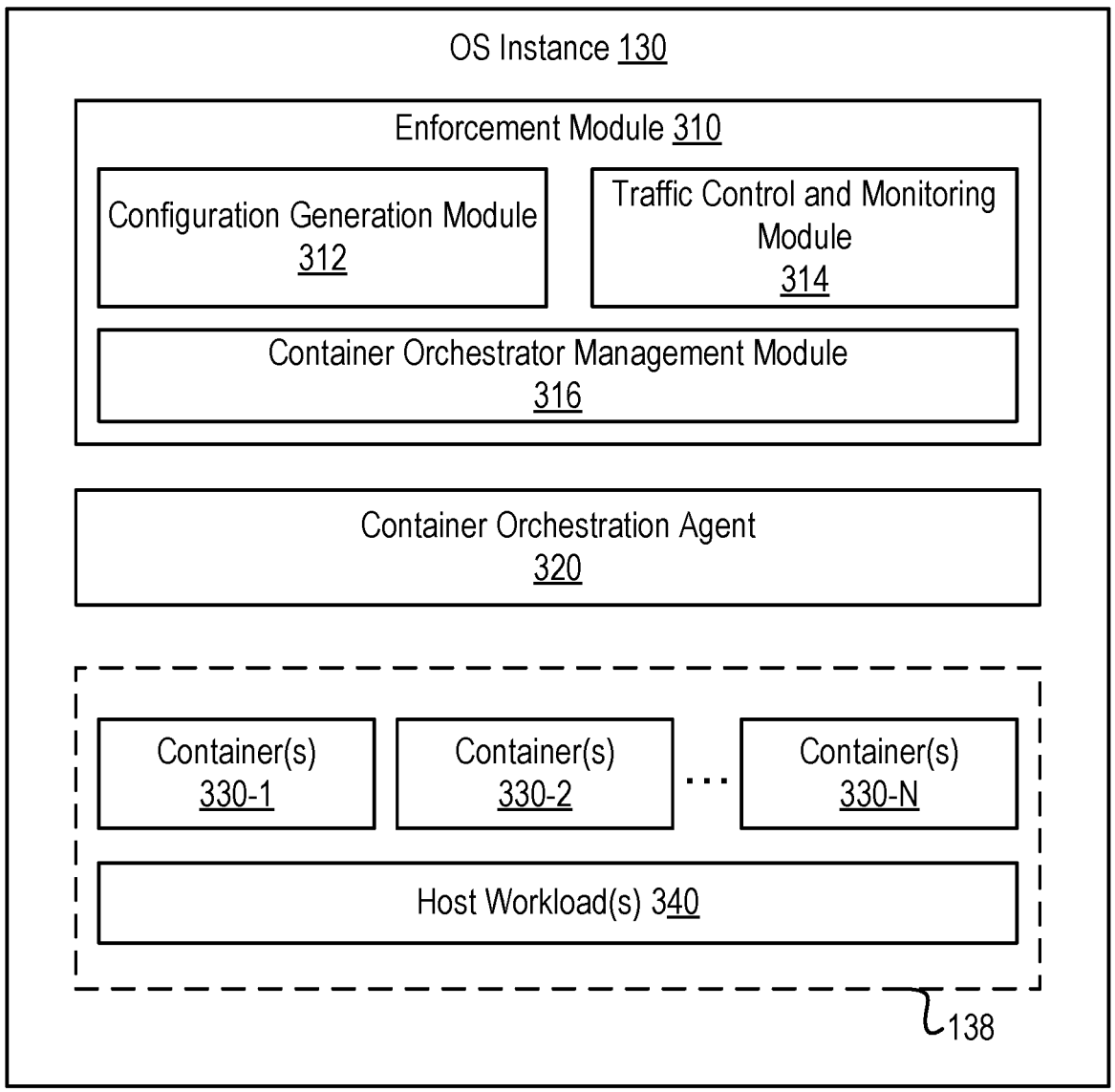
FIG. 3 is a block diagram illustrating example an embodiment of an operating system instance.

FIG. 3 illustrates an example embodiment of an OS instances 130. The OS instance 130 includes an enforcement module 310, a container orchestration agent 320, and workloads 138 which may include one or more host workloads 340 and one or more containers 330 (e.g., containers 330-1, 330-2, . . . , 330-N). The one or more host workloads 340 operate in a host namespace of the operating system instance 130 and thus have visibility to the host file system and processes. In contrast, the containers 330 operate in respective container namespaces that provide isolation from (i.e., are containerized) each other and from the host resources.

The container orchestration agent 320 manages the containers 330 on the OS instance 130. The container orchestration agent 320 may create new containers 330, remove containers 330, or modify operating characteristics of existing containers 330 in response to instructions from the container orchestration server 170. When creating a new container 330, the container orchestration agent 320 obtains the pairing key 224 together with other metadata associated with a container profile 222 from the container orchestration server 170. The container orchestration agent 320 stores the pairing key 224 as metadata associated with the container 330. An example of a container orchestration agent 320 include DOCKER or CONTAINERD.

The enforcement module 310 enforces the segmentation policy on the workloads 138 based on management instructions received for each respective workload 138 from the segmentation server 120. The enforcement module 310 comprises a configuration generation module 312, a traffic control and monitoring module 314, and a container orchestrator management module 316. Alternative embodiments may include different or additional modules.

The container orchestrator management module 316 interfaces with the container orchestration agent 320 to communicate information relating to the containers 330 that enable the enforcement module 310 to enforce the segmentation policy with respect to the containers 330. The container orchestrator management module 316 detects when the container orchestration agent 320 instantiates a new container 330 and obtains the pairing key 324 associated with the newly instantiated container 330. For example, the container orchestrator management module 316 may periodically poll the container orchestration agent 320 for information indicating the current containers 330 under management. Furthermore, the container orchestrator management module 316 may monitor an event stream of the container orchestration agent 320 to detect an event corresponding to instantiation of a new container 330. The container orchestrator management module 316 sends the pairing key 224 to the segmentation server 120 for authentication and may receive a validation message or a denial message in response indicating whether or not the pairing key 224 was validated by the segmentation server 120.

The container orchestrator management module 316 may furthermore obtain requested labels, if any, or other requested characteristics derived from the container profile 222 for the container 330 and send the additional profile information to the segmentation server 120. In an embodiment, the container orchestrator management module 316 may receive an approval or denial message from the segmentation server 120 indicating whether the requested labels or other characteristics are accepted or denied by the segmentation server 120.

The container orchestrator management module 316 may also detect when the container orchestration agent 220 removes a container 330, and send an identifier of the removed container 330 to the segmentation server 120. Furthermore, the container orchestrator management module 316 may detect a change to a container profile 222 associated with a container 330 or a change to the assignment of a particular container profile 222 to a container 330, and send this information to the segmentation server 120 upon detection.

The configuration generation module 312 obtains management instructions for a respective container 330 upon the segmentation server 120 validating the pairing key 224 for a container 330. The management instructions include the relevant rules and relevant membership information for a container 330 based on its label set and the segmentation policy. The configuration generation module 332 then configures the traffic control and monitoring module 314 to control and monitor traffic to and from containers 330 to enforce the management instructions. In an embodiment, the configuration generation module 312 includes an iptables executable that executes to program respective filtering tables of the traffic control and monitoring modules 314. The configuration generation module 312 may similarly obtain management instructions for host workloads 340 and configure the traffic control and monitoring module 314 to enforce the management instruction with respect to the host workloads 340. In an embodiment, the configuration generation module 312 may cause a container 330 to be isolated from other workloads 138 if a denial of the pairing request is received from the segmentation server 130. For example, the configuration generation module 312 may configure the traffic control and monitoring module 314 to block all communications to and from the unpaired container 330.

The traffic control and monitoring module 314 comprises one or more low-level network firewalls or security engines that control and monitor incoming and outgoing traffic associated with each of the workloads 138. The traffic control and monitoring module 314 operates to filter incoming and outgoing packets destined for a particular workload 138 based on a table specifying packets that should be blocked or permitted based on a source and/or destination identifier associated with a packet (e.g., an IP address). Furthermore, the traffic control and monitoring module 314 may place restrictions on how a workload 138 is permitted to communicate. For example, the traffic control and monitoring module 314 may enable a particular workload 138 to communicate using only encrypted protocols and block any unencrypted communications. The traffic control and monitoring module 312 furthermore monitors traffic to and from the workloads 138 on the operating system instance 138 and may report the monitored traffic to the segmentation server 120.

In an embodiment, the traffic control and monitoring module 314 may comprise one or more operating system-level firewalls such as a Linux kernel firewall based on Netfilter modules or a Windows firewall based on a Windows Filtering Platform. Furthermore the traffic control and monitoring modules 314 may comprise one or more Internet Protocol security (IPsec) engines that controls encryption and decryption of packets sent to and from the respective workloads 138.

In an embodiment, the traffic control and monitoring module 314 includes a respective firewall and/or security engine in each namespace (e.g., the host namespace and the one or more container namespaces). Thus, a firewall associated with a first container namespace may include a first filtering table operating in the first container namespace that filters traffic to and from a first container 330-1 and a second container namespace may include a second filtering table operating in the second container namespace that filters traffic to and from a second container 330-2. A host firewall associated with the host namespace may include a host filtering table operating in the host namespace that filters traffic to and from the host workloads 240.

Figure 4:
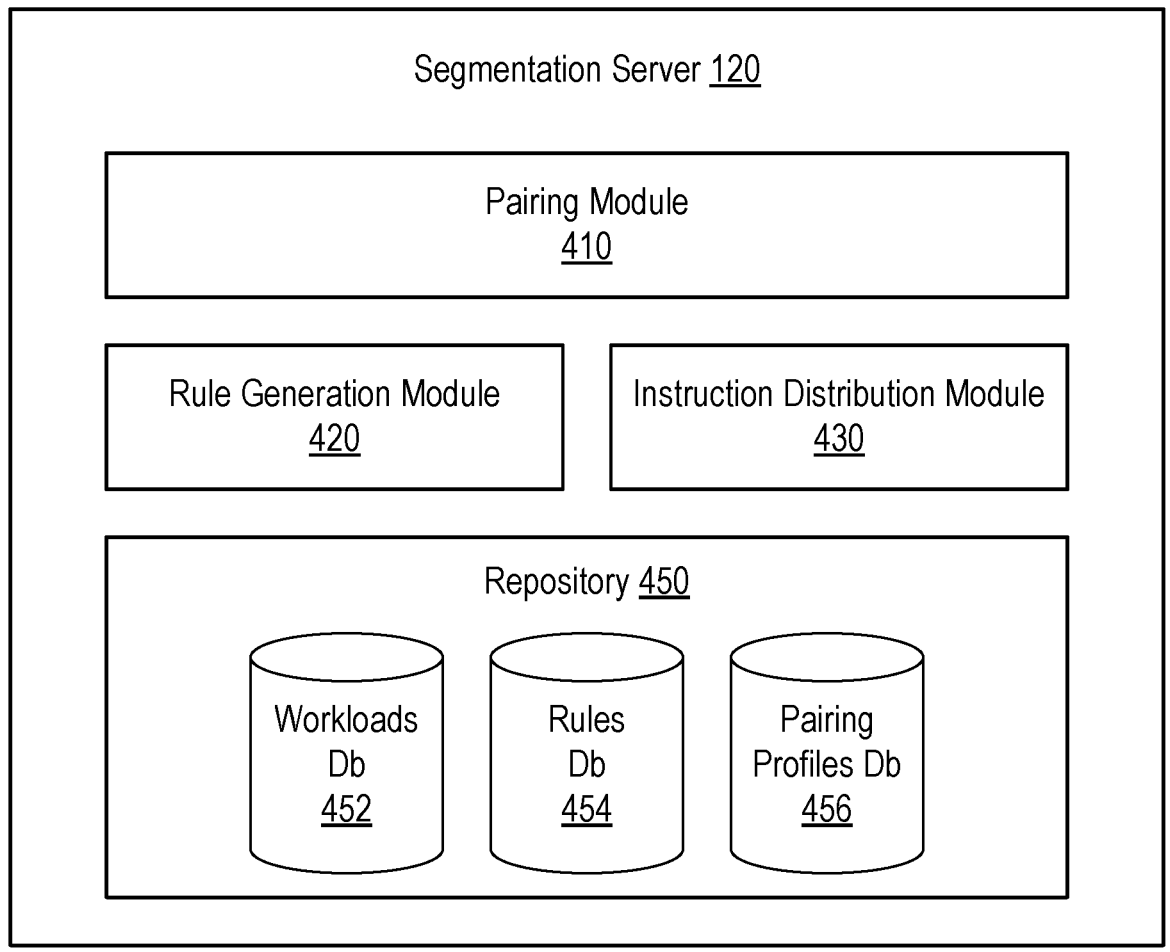
FIG. 4 is a block diagram illustrating an example embodiment of a segmentation server.

FIG. 4 is a high-level block diagram of an embodiment of a segmentation server 120. The segmentation server 120 comprises a pairing module 410, a rule generation module 420, an instruction distribution module 430, and a repository 450. The repository 450 may comprise a workloads database 452 that stores associations between workloads 138 and their respective label sets, a rules database 454 that stores a segmentation policy as a set of rules, and a pairing profiles database 456 that stores pairing profiles for workloads 138. Here, a pairing profile may include, for example, a pairing key, labels, and/or other configuration information for pairing a workload 138 to the segmentation server 120. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The rule generation module 420 automatically generates or updates a segmentation policy comprising a set of rules. The rules may be manually configured by a system administrator or may be generated automatically based on observed traffic flows.

The pairing module 410 controls pairing of the workloads 138 with the segmentation server 120. The pairing module 410 may generate a pairing key 224 and store the pairing key 224 with a particular pairing profile in the pairing profile database 456. The pairing module 410 may generate the pairing key based on a cryptographic identifier. In an embodiment, a unique pairing key 224 is stored for each pairing profile 222 corresponding to a unique label set. Thus, for example, a set of workloads 138 sharing the same label set may pair using the same pairing key 224 but different keys 224 may be required for workloads 138 having different label sets. The pairing module 310 may furthermore store various metadata associated with the pairing key such as, for example, a maximum number of key usages, a key lifespan time period, and a revocation status. Here, a pairing key 224 is valid if it has not exceeded its maximum number of key usages, has a lifetime within the lifespan time period, and is not revoked.

Pairing keys 224 may be distributed to the container orchestration server 170 using an out-of-band communication. For example, the pairing module 410 may be sent to an administrator of the OS instance 130 (e.g., via email or text message accessible by the admin client 160) together with instructions for storing the pairing keys to the container orchestration server 170. The container orchestration server 170 may then in turn provides the pairing keys 224 to the respective container orchestration agents 220 when instantiating new containers 330. In this manner, access to the pairing keys 224 is controlled by the administrator and only containers 330 generated by trusted container orchestration agents 320 having the appropriate pairing keys 224 are able to pair with the segmentation server 120.

Upon receiving a pairing request, the pairing module 410 determines if the pairing key is valid. For example, the pairing module 410 determines that the pairing key is not expired or revoked and matches a pairing key in one of the pairing profiles stored in the pairing profiles database 456. If the pairing module 410 validates the pairing key, the pairing module 410 determines a label set to assign to the workload 138 based on the pairing profile matching the pairing key and/or based on requested labels received with the pairing request. Here, labels associated with the stored pairing profile may be locked or unlocked. If labels associated with the pairing profile are unlocked and the pairing module 410 receives requested labels together with the pairing request, then the pairing module 410 assigns the requested labels to the requesting workload 138. On the other hand, if the labels associated with the pairing profile are locked, then the pairing module assigns the locked labels regardless of the requested labels. In an embodiment, labels along some dimensions may be locked while labels along other dimensions may be unlocked. Furthermore, in an embodiment, the pairing module 410 may deny the pairing request if the requested labels do not match locked labels associated with the pairing profile. Upon validating the pairing key, the segmentation server 120 stores an identifier for the newly paired workload 138 to the workloads database 452 in association with its corresponding label set.

After pairing a new workload 138 with the segmentation server 120, the instruction distribution module 412 generates the management instructions from the rules for a current segmentation policy and distributes the relevant management instructions to the OS instance 130 associated with the newly paired workload 138. Furthermore, the instruction distribution module 412 may update management instructions for other OS instances 130 that are affected by the newly paired workload 138 (e.g., to permit communication with the newly paired workload 138 in accordance with the rules).

If the pairing key is invalid, then the pairing module 410 does not add the requesting workload 138 to the workload database 452. As a result, the requesting workload 138 does not gain membership to any groups that other workloads 138 are permitted to communicate with and the unpaired workload 138 thus remains isolated, thereby maintaining security of the administrative domain 150. The segmentation server 130 may furthermore send a denial message to the requesting OS instance 130 indicating the denial of the pairing request.

Figure 5:
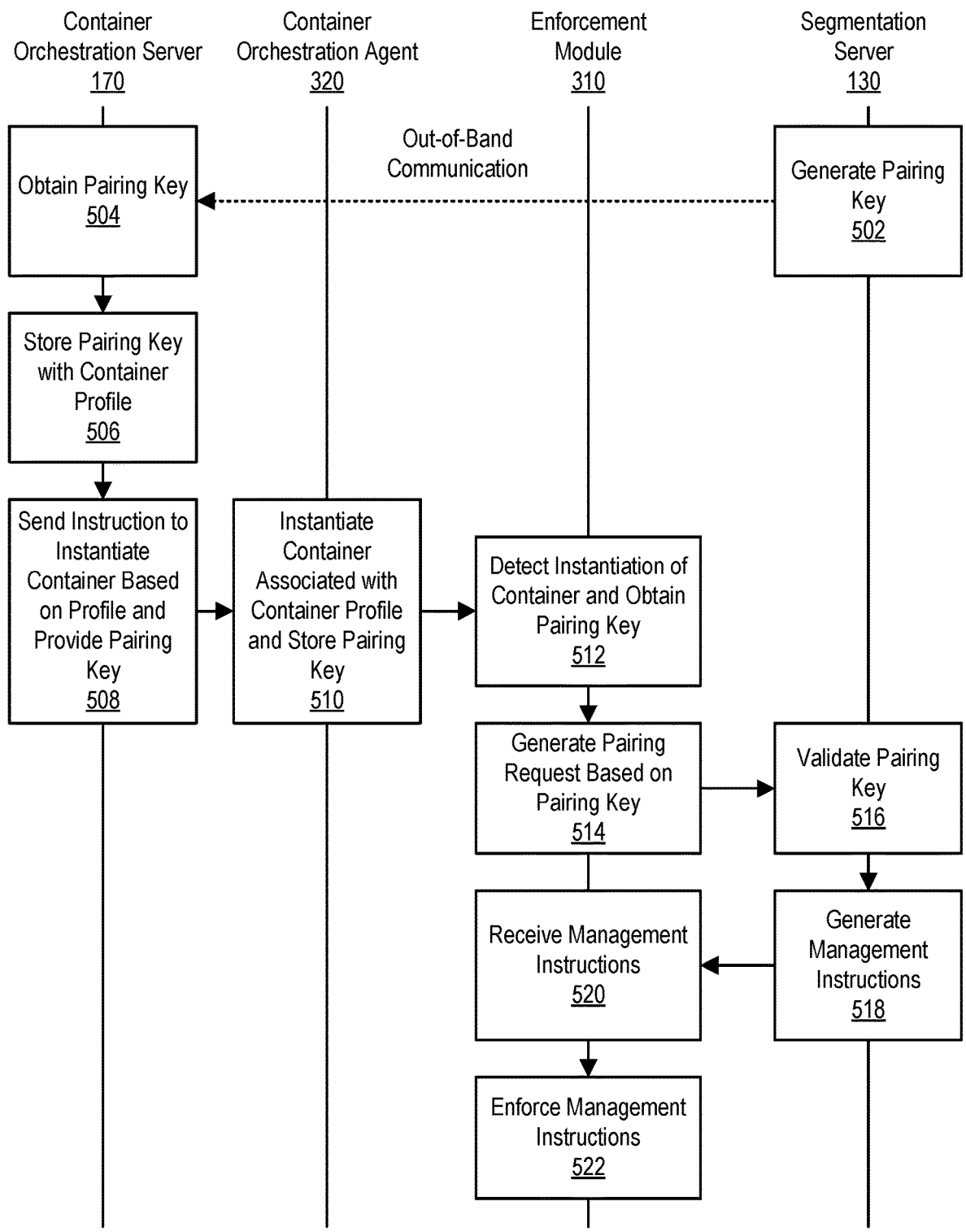
FIG. 5 is a flowchart illustrating an example embodiment of a process for securely pairing a container with a segmentation server.

FIG. 5 illustrates an example embodiment of a process for pairing a container 330 with a segmentation server 120. The segmentation server 120 generates 502 a pairing key associated with a label set. The container orchestration server 170 obtains 504 the pairing key 224 via an out-of-band communication (e.g., through action by a system administrator) and stores 506 the pairing key 224 in association with a container profile 222. The container orchestration server 170 sends 508 an instruction to the container orchestration agent 320 to instantiate a container 330 based on the container profile 222 and provides the pairing key 224. The container orchestration agent 320 instantiates 510 a container 330 based on the container profile 222 and stores the pairing key 224 as metadata associated with the container 330. For example, the container 330 may be instantiated with a particular configuration for executing certain applications or providing certain services based on the information stored in the container profile 222. An enforcement module 310 executing on the OS instance 130 detects 512 the instantiation of the container 330 and obtains the pairing key 224 from the container orchestration agent 320 in response to the detection. The enforcement module 310 generates 514 a pairing request based on the pairing key 224. The pairing request may include the pairing key 224 and may optionally include one or more requested labels or other configured characteristics. The segmentation server 130 receives the pairing request and validates 516 the pairing key 224 if the pairing key 224 is valid. The segmentation server 130 then generates 518, based on a segmentation policy, management instructions for the container 130 based on a pairing profile 222 associated with the validated pairing key 224. The enforcement module 310 receives 520 the management instructions and enforces 522 the management instructions to control communications to and from the container 330 in accordance with the segmentation policy. Enforcement of the management instructions may include, for example, configuring filtering tables of a firewall in the container namespace to permit traffic specified in the management instructions and block other traffic.

The described embodiments beneficially enable secure pairing of containers 330 to a segmentation server 120 to enable communications of the containers 330 to be controlled in accordance with a segmentation policy. By requiring validation of a pairing key 224 by the segmentations server 120 prior providing management instructions to the container 330 and adding the container 330 to a workloads database 452, containers 330 without a valid pairing key 224 are prevented from communicating with other workloads 138 in the administrative domain 150. Furthermore, by associating the pairing key 224 with a permitted label set, containers 330 cannot be arbitrarily assigned labels but may instead be restricted to specific permitted labels associated with the pairing key 224, thereby improving security. Furthermore, in administrative domains 150 where large numbers of containers 330 may be frequently added or removed, the described embodiments beneficially enable an efficient pairing process by causing the container orchestration agent 320 to store pairing keys 224 associated with different container profiles 222 so that pairing may occur automatically upon instantiation of a new container, thereby improving overall performance.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for enforcing a segmentation policy, the method comprising:
   detecting, by an enforcement module executing on an operating system of a computing device, instantiating of a first container by a container orchestrator, the first container associated with a first container profile;
   responsive to detecting the instantiating of the first container, obtaining, by the enforcement module, a first pairing key associated with the first container profile from the container orchestrator;
   generating, by the enforcement module, a first pairing request to a segmentation server based on the first pairing key, wherein the first pairing request includes one or more requested labels for the first container;
   receiving, from the segmentation server, a denial of the one or more requested labels for the first container;
   responsive to the segmentation server validating the first pairing request, receiving, from the segmentation server, first management instructions for enforcing one or more communication rules of the segmentation policy applicable to a default label set associated with the first pairing key for the first container; and
   configuring, by the enforcement module, one or more traffic filters to enforce the first management instructions by controlling communications to and from the first container.

2. The method of claim 1, further comprising:
   detecting, by the enforcement module on the operating system, instantiating of a second container by the container orchestrator, the second container associated with a second container profile;
   responsive to detecting the instantiating of the second container, obtaining, by the enforcement module, a second pairing key associated with the second container profile from the container orchestrator;
   generating, by the enforcement module, a second pairing request to the segmentation server based on the second pairing key;
   responsive to the segmentation server approving the second pairing request, receiving, from the segmentation server, second management instructions for enforcing one or more communication rules of the segmentation policy applicable to the second container; and configuring, by the enforcement module, the one or more traffic filters to enforce the second management instructions by controlling communications to and from the second container.

3. The method of claim 1, further comprising:

detecting, by the enforcement module on the operating system, instantiating of a second container by the container orchestrator, the second container associated with a second container profile;

detecting, by an enforcement module on the operating system, the instantiating of the second container;

responsive to detecting the instantiating of the second container, obtaining, by the enforcement module, a second pairing key associated with the second container profile from the container orchestrator;

generating, by the enforcement module, a second pairing request to the segmentation server based on the second pairing key;

responsive to the segmentation server denying the second pairing request, receiving a denial of the second pairing request from the segmentation server; and blocking communications with the second container responsive to the denial.

4. The method of claim 1, wherein configuring the one or more traffic filters comprises:

configuring a firewall in a first container namespace associated with the first container to control the communications to and from the first container in accordance with the first management instructions.

5. The non-transitory computer-readable storage medium of claim 1, wherein the instructions when executed further cause the processor to perform steps including:

detecting, by the enforcement module on the operating system, instantiating of a second container by the container orchestrator, the second container associated with a second container profile;

detecting, by an enforcement module on the operating system, the instantiating of the second container;

responsive to detecting the instantiating of the second container, obtaining, by the enforcement module, a second pairing key associated with the second container profile from the container orchestrator;

generating, by the enforcement module, a second pairing request to the segmentation server based on the second pairing key;

responsive to the segmentation server denying the second pairing request, receiving a denial of the second pairing request from the segmentation server; and blocking communications with the second container responsive to the denial.

6. A method for enforcing a segmentation policy, the method comprising:

detecting, by an enforcement module executing on an operating system of a computing device, instantiating of a first container by a container orchestrator, the first container associated with a first container profile;

responsive to detecting the instantiating of the first container, obtaining, by the enforcement module, a first pairing key associated with the first container profile from the container orchestrator;

generating, by the enforcement module, a first pairing request to a segmentation server based on the first pairing key, wherein the first pairing request includes one or more requested labels for the first container;

receiving, from the segmentation server, an approval of the one or more requested labels for the first container;

responsive to the segmentation server validating the first pairing request, receiving, from the segmentation server, first management instructions for enforcing one or more communication rules of the segmentation policy applicable to the one or more requested labels for the first container; and configuring, by the enforcement module, one or more traffic filters to enforce the first management instructions by controlling communications to and from the first container.

7. The method of claim 6, further comprising:

prior to detecting the instantiating of the first container, receiving, by a container orchestration agent, an instruction to instantiate the first container according to the first container profile and the first pairing key associated with the first container profile;

instantiating, by the container orchestration agent, the first container associated with the first container profile on the operating system of the computing device; and storing the first pairing key in association with the first container.

8. The method of claim 6, wherein configuring the one or more traffic filters comprises:

configuring a firewall in a first container namespace associated with the first container to control the communications to and from the first container in accordance with the first management instructions.

9. The method of claim 6, further comprising:

detecting, by the enforcement module on the operating system, instantiating of a second container by the container orchestrator, the second container associated with a second container profile;

responsive to detecting the instantiating of the second container, obtaining, by the enforcement module, a second pairing key associated with the second container profile from the container orchestrator;

generating, by the enforcement module, a second pairing request to the segmentation server based on the second pairing key;

responsive to the segmentation server approving the second pairing request, receiving, from the segmentation server, second management instructions for enforcing one or more communication rules of the segmentation policy applicable to the second container; and configuring, by the enforcement module, the one or more traffic filters to enforce the second management instructions by controlling communications to and from the second container.

10. The method of claim 9, further comprising:

prior to detecting the instantiating of the second container, receiving, by the container orchestration agent, an instruction to instantiate the second container according to the second container profile and the second pairing key associated with the second container profile, the second container profile specifying a second set of services different than a first set of services associated with the first container profile;

instantiating, by the container orchestration agent, the second container associated with the second container profile on the operating system of the computing device; and storing the second pairing key in association with the second container.

11. The method of claim 6, further comprising:
   detecting, by the enforcement module on the operating system, instantiating of a second container by the container orchestrator, the second container associated with a second container profile;
   detecting, by an enforcement module on the operating system, the instantiating of the second container;
   responsive to detecting the instantiating of the second container, obtaining, by the enforcement module, a second pairing key associated with the second container profile from the container orchestrator;
   generating, by the enforcement module, a second pairing request to the segmentation server based on the second pairing key;
   responsive to the segmentation server denying the second pairing request, receiving a denial of the second pairing request from the segmentation server; and
   blocking communications with the second container responsive to the denial.

12. A non-transitory computer-readable storage medium storing instructions for enforcing a segmentation policy, the instructions when executed by a processor causing the processor to perform steps including:
   detecting, by an enforcement module executing on an operating system of a computing device, instantiating of a first container by a container orchestrator, the first container associated with a first container profile;
   responsive to detecting the instantiating of the first container, obtaining, by the enforcement module, a first pairing key associated with the first container profile from the container orchestrator;
   generating, by the enforcement module, a first pairing request to a segmentation server based on the first pairing key, wherein the first pairing request includes one or more requested labels for the first container;
   receiving, from the segmentation server, an approval of the one or more requested labels for the first container;
   responsive to the segmentation server validating the first pairing request, receiving, from the segmentation server, first management instructions for enforcing one or more communication rules of the segmentation policy applicable to the one or more requested labels for the first container; and
   configuring, by the enforcement module, one or more traffic filters to enforce the first management instructions by controlling communications to and from the first container.

13. The non-transitory computer-readable storage medium of claim 12, wherein the instructions when executed further cause the processor to perform steps including:
   prior to detecting the instantiating of the first container, receiving, by a container orchestration agent, an instruction to instantiate the first container according to the first container profile and the first pairing key associated with the first container profile;
   instantiating, by the container orchestration agent, the first container associated with the first container profile on the operating system of the computing device; and
   storing the first pairing key in association with the first container.

14. The non-transitory computer-readable storage medium of claim 12, wherein configuring the one or more traffic filters comprises:
   configuring a firewall in a first container namespace associated with the first container to control the communications to and from the first container in accordance with the first management instructions.

15. The non-transitory computer-readable storage medium of claim 12, the instructions when executed by the processor further causing the processor to perform steps including:
   detecting, by the enforcement module on the operating system, instantiating of a second container by the container orchestration agent, the second container associated with a second container profile;
   responsive to detecting the instantiating of the second container, obtaining, by the enforcement module, a second pairing key associated with the second container profile from the container orchestration agent;
   generating, by the enforcement module, a second pairing request to the segmentation server based on the second pairing key;
   responsive to the segmentation server approving the second pairing request, receiving, from the segmentation server, second management instructions for enforcing one or more communication rules of the segmentation policy applicable to the second container; and
   configuring, by the enforcement module, the one or more traffic filters to enforce the second management instructions by controlling communications to and from the second container.

16. The non-transitory computer-readable storage medium of claim 15, the instructions when executed by the processor further causing the processor to perform steps including:
   prior to detecting the instantiating of the second container, receiving, by the container orchestration agent, an instruction to instantiate the second container according to the second container profile and the second pairing key associated with the second container profile, the second container profile specifying a second set of services different than a first set of services associated with the first container profile;
   instantiating, by the container orchestration agent, the second container associated with the second container profile on the operating system of the computing device; and
   storing the second pairing key in association with the second container.

17. The non-transitory computer-readable storage medium of claim 12, the instructions when executed by the processor further causing the processor to perform steps including:
   detecting, by the enforcement module on the operating system, instantiating of a second container by the container orchestration agent, the second container associated with a second container profile;
   detecting, by an enforcement module on the operating system, the instantiating of the second container;
   responsive to detecting the instantiating of the second container, obtaining, by the enforcement module, a second pairing key associated with the second container profile from the container orchestration agent;
   generating, by the enforcement module, a second pairing request to the segmentation server based on the second pairing key;
   responsive to the segmentation server denying the second pairing request, receiving a denial of the second pairing request from the segmentation server; and
   blocking communications with the second container responsive to the denial.

18. The non-transitory computer-readable storage medium of claim 12, wherein configuring the one or more traffic filters comprises:
configuring a firewall in a first container namespace associated with the first container to control the communications to and from the first container in accordance with the first management instructions.

19. A non-transitory computer-readable storage medium storing instructions for enforcing a segmentation policy, the instructions when executed by a processor causing the processor to perform steps including:
detecting, by an enforcement module executing on an operating system of a computing device, instantiating of a first container by a container orchestrator, the first container associated with a first container profile;
responsive to detecting the instantiating of the first container, obtaining, by the enforcement module, a first pairing key associated with the first container profile from the container orchestrator;
generating, by the enforcement module, a first pairing request to a segmentation server based on the first pairing key, wherein the first pairing request includes one or more requested labels for the first container;
receiving, from the segmentation server, a denial of the one or more requested labels for the first container;
responsive to the segmentation server validating the first pairing request, receiving, from the segmentation server, first management instructions for enforcing one or more communication rules of the segmentation policy applicable to a default label set associated with the first pairing key for the first container; and
configuring, by the enforcement module, one or more traffic filters to enforce the first management instructions by controlling communications to and from the first container.

20. The non-transitory computer-readable storage medium of claim 19, wherein the instructions when executed further cause the processor to perform steps including:
detecting, by the enforcement module on the operating system, instantiating of a second container by the container orchestrator, the second container associated with a second container profile;
responsive to detecting the instantiating of the second container, obtaining, by the enforcement module, a second pairing key associated with the second container profile from the container orchestrator;
generating, by the enforcement module, a second pairing request to the segmentation server based on the second pairing key;
responsive to the segmentation server approving the second pairing request, receiving, from the segmentation server, second management instructions for enforcing one or more communication rules of the segmentation policy applicable to the second container; and
configuring, by the enforcement module, the one or more traffic filters to enforce the second management instructions by controlling communications to and from the second container.

\* \* \* \* \*